(12) United States Patent
Bretagna

(10) Patent No.: US 10,165,895 B1
(45) Date of Patent: Jan. 1, 2019

(54) DISPOSABLE INSERT OVEN GRATE SYSTEM

(71) Applicant: John Bretagna, Palm Harbor, FL (US)

(72) Inventor: John Bretagna, Palm Harbor, FL (US)

(*) Notice: Subject to any disclaimer, the term of this patent is extended or adjusted under 35 U.S.C. 154(b) by 0 days.

(21) Appl. No.: 15/877,830

(22) Filed: Jan. 23, 2018

(51) Int. Cl.
  *A47J 37/06* (2006.01)
  *A47J 36/20* (2006.01)
  *A47J 36/02* (2006.01)

(52) U.S. Cl.
  CPC ........ *A47J 37/0694* (2013.01); *A47J 36/022* (2013.01); *A47J 36/20* (2013.01)

(58) Field of Classification Search
  CPC .................................. A47J 37/067–37/0786
  See application file for complete search history.

(56) References Cited

U.S. PATENT DOCUMENTS

| | | | | |
|---|---|---|---|---|
| 3,353,527 A | * | 11/1967 | Anderson | A47J 37/0768 126/25 R |
| 4,428,281 A | * | 1/1984 | Miller | A47J 37/067 99/445 |
| 5,453,574 A | * | 9/1995 | Zuran | A47J 37/067 126/25 R |
| 7,247,824 B1 | * | 7/2007 | Garavito | A47J 36/022 219/733 |
| 8,616,119 B2 | * | 12/2013 | Penny | A47J 37/07 99/324 |
| 9,668,614 B1 | * | 6/2017 | Bretagna | A47J 37/0694 |
| 2010/0133142 A1 | * | 6/2010 | Avery | A21B 3/131 206/557 |
| 2011/0318456 A1 | * | 12/2011 | Walraevens | A23G 1/005 426/113 |
| 2014/0260486 A1 | * | 9/2014 | Anderson | B21D 33/00 72/252.5 |
| 2016/0051088 A1 | * | 2/2016 | Brogger | A47J 37/0768 126/25 R |
| 2018/0140133 A1 | * | 5/2018 | Brogger | A47J 37/0768 |

* cited by examiner

Primary Examiner — Michael Laflame, Jr.

(57) ABSTRACT

A disposable grill is formed with a central region having a periphery in a rectangular configuration. The periphery has a front edge, a rear edge, a left edge, and a right edge, a front wall, a rear wall, a left wall, and a right wall. Hinges couple the walls to associated edges. Each wall is pivotable between an upper position coplanar with the central region for storage and transportation and pivotable to a lower position perpendicular to the central region for supporting food to be cooked. A plurality of slots are formed in the central region. Each slot is rectangular and formed of a longitudinal slit and latitudinal end slits to form downwardly extending supports for strengthening purposes.

1 Claim, 1 Drawing Sheet

DISPOSABLE INSERT OVEN GRATE SYSTEM

RELATED APPLICATION

The present application is based upon Provisional Application No. 62/500,749 filed May 3, 2017, the subject matter of which is incorporated herein by reference and the priority of which is hereby claimed.

BACKGROUND OF THE INVENTION

Field of the Invention

The present invention relates to a disposable insert oven grate system and more particularly pertains to cooking food on a grill and readily disposing of the grill after use.

Description of the Prior Art

The use of grill/pan systems of known design and configurations is known in the prior art. More specifically, grill/pan systems of known design and configurations previously devised and utilized for the purpose of cooking food are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe a disposable insert oven grate system that allows cooking food on a grill and readily disposing of the grill after use.

In this respect, the disposable insert oven grate system according to the present invention substantially departs from the conventional concepts and designs of the prior art, and in doing so provides an apparatus primarily developed for the purpose of cooking food on a grill and readily disposing of the grill after use.

Therefore, it can be appreciated that there exists a continuing need for a new and improved disposable insert oven grate system which can be used for cooking food on a grill and readily disposing of the grill after use. In this regard, the present invention substantially fulfills this need.

SUMMARY OF THE INVENTION

In view of the disadvantages inherent in the known types of grill/pan systems of known design and configurations now present in the prior art, the present invention provides an improved disposable insert oven grate system. As such, the general purpose of the present invention, which will be described subsequently in greater detail, is to provide a new and improved disposable insert oven grate system and method which has all the advantages of the prior art and none of the disadvantages.

To attain this, from a broad perspective, the present invention essentially comprises a disposable insert oven grate system 10. A disposable grill 14 is formed with a central region having a periphery in a rectangular configuration. The periphery has a front edge 16, a rear edge 18, a left edge 20, a right edge 22, a front wall 26, a rear wall 30, a left wall 34, and a right wall 40. A front hinge 28 couples the front wall to the front edge. A rear hinge 32 couples the rear wall to the rear edge. A left hinge 36 couples the left wall to the left edge. A right hinge 42 couples the right wall to the right edge. Each wall is pivotable between an upper position coplanar with the central region for storage and transportation. Each wall is pivotable to a lower position perpendicular to the central region for supporting food to be cooked. A plurality of slots 46 are formed in the central region. Each slot is rectangular and formed of a longitudinal slit and latitudinal end slits to form downwardly extending supports 48 for strengthening purposes.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved disposable insert oven grate system which has all of the advantages of the prior art grill/pan systems of known design and configurations and none of the disadvantages.

It is another object of the present invention to provide a new and improved disposable insert oven grate system which may be easily and efficiently manufactured and marketed.

It is a further object of the present invention to provide a new and improved disposable insert oven grate system which is of durable and reliable constructions.

An even further object of the present invention is to provide a new and improved disposable insert oven grate system which is susceptible of a low cost of manufacture with regard to both materials and labor, and which accordingly is then susceptible of low prices of sale to the consuming public, thereby making such disposable insert oven grate system economically available to the buying public.

Lastly, it is an object of the present invention to provide a disposable insert oven grate system for cooking food on a grill and readily disposing of the grill after use.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
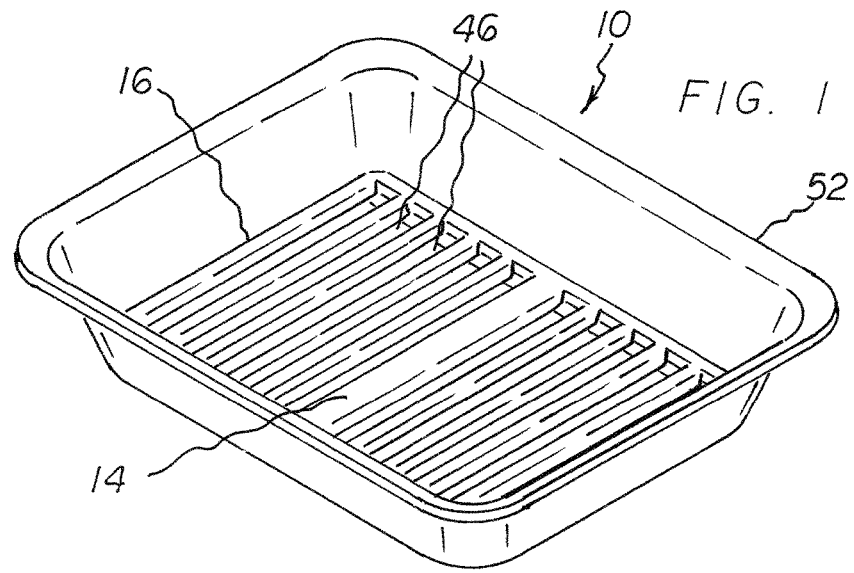
FIG. 1 is a perspective illustration of a disposable grill/pan system constructed in accordance with the principles of the present invention.
Figure 2:
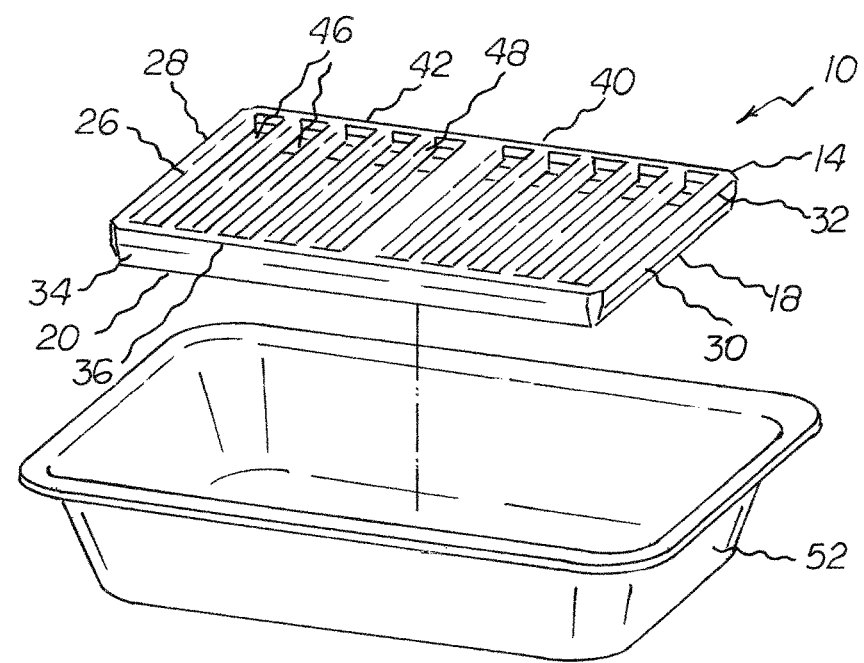
FIG. 2 is an exploded perspective illustration of the disposable grill/pan system shown in FIG. 1.

With reference now to the drawings, and in particular to FIG. 1 thereof, the preferred embodiment of the new and improved disposable insert oven grate system embodying the principles and concepts of the present invention and generally designated by the reference numeral 10 will be described.

The present invention, the disposable insert oven grate system 10 is comprised of a plurality of components. Such components in their broadest context include a disposable grill with a central region having a plurality of slots. Such components are individually configured and correlated with respect to each other so as to attain the desired objective.

From a specific perspective, the invention of the present application is a disposable insert oven grate system 10. First provided is a disposable grill 14 having a central region in a horizontal plane. The central region has an upper surface facing upwardly and a lower surface facing downwardly. The central region has a periphery in a rectangular configuration. The periphery has a front edge 16, a rear edge 18, a left edge 20, and a right edge 22. The central region has a length of 8 to 9 inches and a width of 10.5 inches to 11.5 inches.

A front wall 26, a rear wall 30, a left wall 34, and a right wall 40 are next provided. A front hinge 28 couples the front wall to the front edge. A rear hinge 32 couples the rear hinge to the rear edge. A left hinge 36 couples the left hinge to the left edge 38. A right hinge 42 couples the right wall to the right edge. Each wall is pivotable between an upper position coplanar with the central region for storage and transportation. Each wall is pivotable to a lower position coplanar with the central region for supporting food to be cooked. Each wall extends downwardly for from 1.0 to 1.5 inches.

Next provided are a plurality of slots 46 formed in the central region. Each slot is rectangular and extends between a location adjacent to the left edge and the right edge. Each slot is formed of a longitudinal slit and latitudinal end slits to form downwardly extending supports 48 for strengthening purposes. Each wall extends downwardly from 1.0 to 1.5 inches. Each support extends downwardly for from 0.3 to 0.5 inches. The disposable grill is fabricated of aluminum foil having a thickness of from 0.0030 inches to 0.0065 inches.

Next provided is a pan 52. The pan is disposable. The pan has an imperforate bottom in a rectangular configuration. The bottom has a front edge and a rear edge separated by a length of 11¾ inches, plus or minus 5 percent. The imperforate bottom has side edges separated by a width of 8 inches, plus or minus 5 percent. The pan has imperforate sides. Each side is in a trapezoidal configuration. Each side extends upwardly from the front edge and rear edge and side edges of the bottom thereby forming an angle of between 10 degrees and 20 degrees with respect to the bottom. The sides have lower ends integrally formed with the bottom. The sides have free upper ends forming an upper opening. The pan forms a chamber between the bottom and the upper opening and within the sides. The chamber has a height of 1.5 to 2.0 inches between the bottom and the upper opening. The pan is fabricated of aluminum foil having a thickness of from 0.0030 inches to 0.0065 inches.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A disposable insert oven grate system (10) comprising:
   a disposable grill (14) having a central region in a horizontal plane, the central region having an upper surface facing upwardly and a lower surface facing downwardly, the central region having a periphery in a rectangular configuration, the periphery having a front edge (16) and a rear edge (18) and a left edge (20) and a right edge (22), the central region having a length of 8 to 9 inches and a width of 10.5 inches to 11.5 inches
   a front wall (26) with a front hinge (28) coupled to the front edge, a rear wall (30) with a rear hinge (32) coupled to the rear edge, a left wall (34) with a left hinge (36) coupled to the left edge, a right wall (40) with a right hinge (42) coupled to the right edge, each wall pivotable between an upper position coplanar with the central region for storage and transportation, each wall pivotable to a lower position coplanar with the central region for supporting food to be cooked, each wall extending downwardly for from 1.0 to 1.5 inches;
   a plurality of slots (46) formed in the central region, each slot being rectangular and extending between a location adjacent to the left edge and the right edge, each slot being formed of a longitudinal slit and latitudinal end slits to form downwardly extending supports (48) for strengthening purposes, each wall extending downwardly from 1.0 to 1.5 inches, each support extending downwardly for from 0.3 to 0.5 inches, the disposable grill being fabricated of aluminum foil having a thickness of from 0.0030 inches to 0.0065 inches;
   a pan (52), the pan being disposable, the pan having an imperforate bottom in a rectangular configuration, the bottom having a front edge and a rear edge separated by a length of 11¾ inches, plus or minus 5 percent, the bottom having side edges, the side edges separated by a width of 8 inches, plus or minus 5 percent, the pan having imperforate sides, each side being in a trapezoidal configuration, each side extending upwardly from the front edge and rear edge and side edges of the bottom thereby forming an angle of between 10 degrees and 20 degrees with respect to the bottom, the sides having lower ends, the lower ends being integrally formed with the bottom, the sides having free upper ends forming an upper opening, the pan forming a chamber between the bottom and the upper opening and within the sides, the chamber having a height of 1.5 to 2.0 inches between the bottom and the upper opening, the pan being fabricated of aluminum foil having a thickness of from 0.0030 inches to 0.0065 inches.

* * * * *